(12) United States Patent  
Hamada

(10) Patent No.: US 7,800,772 B2  
(45) Date of Patent: Sep. 21, 2010

(54) DATA PROCESSING APPARATUS, IMAGE FORMING APPARATUS, IMAGE FORMING METHOD, AND PRINTING SYSTEM

(75) Inventor: Ryoh Hamada, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 11/559,925

(22) Filed: Nov. 15, 2006

(65) Prior Publication Data

US 2007/0121172 A1 May 31, 2007

(30) Foreign Application Priority Data

Nov. 28, 2005 (JP) ............................. 2005-342370

(51) Int. Cl.
*G06F 3/12* (2006.01)
(52) U.S. Cl. ...................... 358/1.15; 358/419; 358/435; 358/436; 713/300; 713/320
(58) Field of Classification Search ................ 358/419, 358/1.15, 435, 436; 713/300, 320
See application file for complete search history.

(56) References Cited

U.S. PATENT DOCUMENTS

| | | | | |
|---|---|---|---|---|
| 6,166,355 | A * | 12/2000 | Watanabe et al. | 219/497 |
| 6,724,493 | B1 * | 4/2004 | Maruta et al. | 358/1.14 |
| 6,810,482 | B1 * | 10/2004 | Saxena et al. | 713/320 |
| 6,928,564 | B2 * | 8/2005 | Tada et al. | 713/321 |
| 2003/0048317 | A1 * | 3/2003 | Usui et al. | 347/14 |
| 2004/0051895 | A1 * | 3/2004 | Aizawa | 358/1.13 |
| 2004/0156058 | A1 * | 8/2004 | Takada | 358/1.9 |
| 2005/0066206 | A1 * | 3/2005 | Beers et al. | 713/320 |
| 2005/0179935 | A1 * | 8/2005 | Ogura et al. | 358/1.14 |
| 2005/0223249 | A1 * | 10/2005 | Samson | 713/320 |
| 2005/0240786 | A1 * | 10/2005 | Ranganathan | 713/320 |
| 2005/0254465 | A1 * | 11/2005 | Lundby et al. | 370/335 |
| 2006/0274368 | A1 * | 12/2006 | Imine | 358/1.15 |

FOREIGN PATENT DOCUMENTS

| | | |
|---|---|---|
| JP | 2002-092087 | 3/2002 |
| JP | 2002-169676 | 6/2002 |
| JP | 2004-046774 | 2/2004 |
| JP | 2004-62359 | 2/2004 |
| JP | 2004-074530 | 3/2004 |
| JP | 2004-118240 | 4/2004 |
| JP | 2005-085164 | 3/2005 |
| JP | 2005-100399 | 4/2005 |

* cited by examiner

*Primary Examiner*—David K Moore
*Assistant Examiner*—Benjamin O Dulaney
(74) *Attorney, Agent, or Firm*—Renner, Otto, Boisselle & Sklar, LLP

(57) ABSTRACT

A data processing apparatus, an image forming apparatus, an image forming method, and a printing system capable of improving processing capacity or power use efficiency are provided.

At least one of a plurality of data processing apparatuses that are connected to a network stores correlation between data processing capacity and power consumption of each data processing apparatus, and selects a data processing apparatus with which power consumption required for processing a processing request produced by the at least one data processing apparatus is minimized based on the correlation between the data processing capacity and the power consumption. According to this selection, the at least one data processing apparatus transmits the processing request to the selected data processing apparatus, and receives data processed by the selected data processing apparatus.

13 Claims, 11 Drawing Sheets

TABLE 1

| | operating status | normalization power consumption | normalization processing capacity |
|---|---|---|---|
| System A | 1 | 1.00 | 2.50 |
| | 2 | 1.17 | 3.00 |
| | 3 | 1.33 | 4.00 |
| System B | 1 | 1.00 | 3.00 |
| | 2 | 1.55 | 3.10 |
| | 3 | 1.78 | 3.25 |
| | 4 | 2.00 | 3.40 |
| System C | 1 | 2.29 | 4.50 |
| | 2 | 2.50 | 5.00 |
| | 3 | 2.78 | 5.30 |
| | 4 | 3.00 | 5.40 |

TABLE 1

FIG.4

| | operating status | normalization power consumption | normalization processing capacity |
|---|---|---|---|
| System A | 1 | 1.00 | 2.50 |
| | 2 | 1.17 | 3.00 |
| | 3 | 1.33 | 4.00 |
| System B | 1 | 1.00 | 3.00 |
| | 2 | 1.55 | 3.10 |
| | 3 | 1.78 | 3.25 |
| | 4 | 2.00 | 3.40 |
| System C | 1 | 2.29 | 4.50 |
| | 2 | 2.50 | 5.00 |
| | 3 | 2.78 | 5.30 |
| | 4 | 3.00 | 5.40 |

TABLE 2

FIG.5

| amount of requested processing | operating status | | |
|---|---|---|---|
| | System A | System B | System C |
| 1 | 1 | 0 | 0 |
| 1.17 | 2 | 0 | 0 |
| 1.33 | 3 | 0 | 0 |
| 1.55 | 0 | 2 | 0 |
| 1.78 | 0 | 3 | 0 |
| 2 | 0 | 4 | 0 |
| 2.29 | 0 | 0 | 1 |
| 2.5 | 0 | 0 | 2 |
| 2.78 | 0 | 0 | 3 |
| 3 | 0 | 0 | 4 |
| 3.33 | 3 | 4 | 0 |
| ⋮ | ⋮ | ⋮ | ⋮ |
| 5 | 0 | 4 | 4 |
| 5.17 | 1 | 4 | 4 |
| 5.33 | 2 | 4 | 4 |
| 6.33 | 3 | 4 | 4 |

FIG.9

| | operating status | normalization processing capacity | normalization power consumption |
|---|---|---|---|
| System A | 1 | 1.00 | 2.50 |
| | 2 | 1.17 | 3.00 |
| | 3 | 1.33 | 4.00 |
| System B | 1 | 1.00 | 3.00 |
| | 2 | 1.55 | 3.10 |
| | 3 | 1.78 | 3.25 |
| | 4 | 2.00 | 3.40 |
| System C | 1 | 2.29 | 4.50 |
| | 2 | 2.50 | 5.00 |
| | 3 | 2.78 | 5.30 |
| | 4 | 3.00 | 5.40 |

FIG.10

| operating status | | | processing capacity | | | power consumption | | | total processing capacity | total power consumption |
|---|---|---|---|---|---|---|---|---|---|---|
| A | B | C | A | B | C | A | B | C | | |
| 0 | 0 | 0 | 0.00 | 0.00 | 0.00 | 0.00 | 0.00 | 0.00 | 0.00 | 0.00 |
| 0 | 0 | 1 | 0.00 | 0.00 | 2.29 | 0.00 | 0.00 | 4.50 | 2.29 | 4.50 |
| 0 | 0 | 2 | 0.00 | 0.00 | 2.50 | 0.00 | 0.00 | 5.00 | 2.50 | 5.00 |
| 0 | 0 | 3 | 0.00 | 0.00 | 2.78 | 0.00 | 0.00 | 5.30 | 2.78 | 5.30 |
| 0 | 0 | 4 | 0.00 | 0.00 | 3.00 | 0.00 | 0.00 | 5.40 | 3.00 | 5.40 |
| 0 | 1 | 0 | 0.00 | 1.00 | 0.00 | 0.00 | 3.00 | 0.00 | 1.00 | 3.00 |
| 0 | 1 | 1 | 0.00 | 1.00 | 2.29 | 0.00 | 3.00 | 4.50 | 3.29 | 7.50 |
| 0 | 1 | 2 | 0.00 | 1.00 | 2.50 | 0.00 | 3.00 | 5.00 | 3.50 | 8.00 |
| 0 | 1 | 3 | 0.00 | 1.00 | 2.78 | 0.00 | 3.00 | 5.30 | 3.78 | 8.30 |
| 0 | 1 | 4 | 0.00 | 1.00 | 3.00 | 0.00 | 3.00 | 5.40 | 4.00 | 8.40 |
| 0 | 2 | 0 | 0.00 | 1.55 | 0.00 | 0.00 | 3.10 | 0.00 | 1.55 | 3.10 |
| 0 | 2 | 1 | 0.00 | 1.55 | 2.29 | 0.00 | 3.10 | 4.50 | 3.85 | 7.60 |
| 0 | 2 | 2 | 0.00 | 1.55 | 2.50 | 0.00 | 3.10 | 5.00 | 4.05 | 8.10 |
| 0 | 2 | 3 | 0.00 | 1.55 | 2.78 | 0.00 | 3.10 | 5.30 | 4.34 | 8.40 |
| 0 | 2 | 4 | 0.00 | 1.55 | 3.00 | 0.00 | 3.10 | 5.40 | 4.55 | 8.50 |
| 0 | 3 | 0 | 0.00 | 1.78 | 0.00 | 0.00 | 3.25 | 0.00 | 1.78 | 3.25 |
| 0 | 3 | 1 | 0.00 | 1.78 | 2.29 | 0.00 | 3.25 | 4.50 | 4.07 | 7.75 |
| 0 | 3 | 2 | 0.00 | 1.78 | 2.50 | 0.00 | 3.25 | 5.00 | 4.28 | 8.25 |
| 0 | 3 | 3 | 0.00 | 1.78 | 2.78 | 0.00 | 3.25 | 5.30 | 4.56 | 8.55 |
| 0 | 3 | 4 | 0.00 | 1.78 | 3.00 | 0.00 | 3.25 | 5.40 | 4.78 | 8.65 |
| 0 | 4 | 0 | 0.00 | 2.00 | 0.00 | 0.00 | 3.40 | 0.00 | 2.00 | 3.40 |
| 0 | 4 | 1 | 0.00 | 2.00 | 2.29 | 0.00 | 3.40 | 4.50 | 4.29 | 7.90 |
| 0 | 4 | 2 | 0.00 | 2.00 | 2.50 | 0.00 | 3.40 | 5.00 | 4.50 | 8.40 |
| 0 | 4 | 3 | 0.00 | 2.00 | 2.78 | 0.00 | 3.40 | 5.30 | 4.78 | 8.70 |
| 0 | 4 | 4 | 0.00 | 2.00 | 3.00 | 0.00 | 3.40 | 5.40 | 5.00 | 8.80 |
| 1 | 0 | 0 | 1.00 | 0.00 | 0.00 | 2.50 | 0.00 | 0.00 | 1.00 | 2.50 |
| 1 | 0 | 1 | 1.00 | 0.00 | 2.29 | 2.50 | 0.00 | 4.50 | 3.29 | 7.00 |
| 1 | 0 | 2 | 1.00 | 0.00 | 2.50 | 2.50 | 0.00 | 5.00 | 3.50 | 7.50 |
| 1 | 0 | 3 | 1.00 | 0.00 | 2.78 | 2.50 | 0.00 | 5.30 | 3.78 | 7.80 |
| 1 | 0 | 4 | 1.00 | 0.00 | 3.00 | 2.50 | 0.00 | 5.40 | 4.00 | 7.90 |
| 1 | 1 | 0 | 1.00 | 1.00 | 0.00 | 2.50 | 3.00 | 0.00 | 2.00 | 5.50 |
| 1 | 1 | 1 | 1.00 | 1.00 | 2.29 | 2.50 | 3.00 | 4.50 | 4.29 | 10.00 |
| 1 | 1 | 2 | 1.00 | 1.00 | 2.50 | 2.50 | 3.00 | 5.00 | 4.50 | 10.50 |
| 1 | 1 | 3 | 1.00 | 1.00 | 2.78 | 2.50 | 3.00 | 5.30 | 4.78 | 10.80 |
| | | | | | (omitted here) | | | | | |
| 3 | 2 | 0 | 1.33 | 1.55 | 0.00 | 4.00 | 3.10 | 0.00 | 2.89 | 7.10 |
| 3 | 2 | 1 | 1.33 | 1.55 | 2.29 | 4.00 | 3.10 | 4.50 | 5.18 | 11.60 |
| 3 | 2 | 2 | 1.33 | 1.55 | 2.50 | 4.00 | 3.10 | 5.00 | 5.39 | 12.10 |
| 3 | 2 | 3 | 1.33 | 1.55 | 2.78 | 4.00 | 3.10 | 5.30 | 5.67 | 12.40 |
| 3 | 2 | 4 | 1.33 | 1.55 | 3.00 | 4.00 | 3.10 | 5.40 | 5.89 | 12.50 |
| 3 | 3 | 0 | 1.33 | 1.78 | 0.00 | 4.00 | 3.25 | 0.00 | 3.11 | 7.25 |
| 3 | 3 | 1 | 1.33 | 1.78 | 2.29 | 4.00 | 3.25 | 4.50 | 5.40 | 11.75 |
| 3 | 3 | 2 | 1.33 | 1.78 | 2.50 | 4.00 | 3.25 | 5.00 | 5.61 | 12.25 |
| 3 | 3 | 3 | 1.33 | 1.78 | 2.78 | 4.00 | 3.25 | 5.30 | 5.89 | 12.55 |
| 3 | 3 | 4 | 1.33 | 1.78 | 3.00 | 4.00 | 3.25 | 5.40 | 6.11 | 12.65 |
| 3 | 4 | 0 | 1.33 | 2.00 | 0.00 | 4.00 | 3.40 | 0.00 | 3.33 | 7.40 |
| 3 | 4 | 1 | 1.33 | 2.00 | 2.29 | 4.00 | 3.40 | 4.50 | 5.63 | 11.90 |
| 3 | 4 | 2 | 1.33 | 2.00 | 2.50 | 4.00 | 3.40 | 5.00 | 5.83 | 12.40 |
| 3 | 4 | 3 | 1.33 | 2.00 | 2.78 | 4.00 | 3.40 | 5.30 | 6.12 | 12.70 |
| 3 | 4 | 4 | 1.33 | 2.00 | 3.00 | 4.00 | 3.40 | 5.40 | 6.33 | 12.80 |

FIG.11

| operating status | | | processing capacity | | | power consumption | | | total processing capacity | total power consumption |
|---|---|---|---|---|---|---|---|---|---|---|
| A | B | C | A | B | C | A | B | C | | |
| 0 | 0 | 0 | 0.00 | 0.00 | 0.00 | 0.00 | 0.00 | 0.00 | 0.00 | 0.00 |
| 1 | 0 | 0 | 1.00 | 0.00 | 0.00 | 2.50 | 0.00 | 0.00 | 1.00 | 2.50 |
| 0 | 1 | 0 | 0.00 | 1.00 | 0.00 | 0.00 | 3.00 | 0.00 | 1.00 | 3.00 |
| 2 | 0 | 0 | 1.17 | 0.00 | 0.00 | 3.00 | 0.00 | 0.00 | 1.17 | 3.00 |
| 2 | 0 | 0 | 1.17 | 0.00 | 0.00 | 3.00 | 0.00 | 0.00 | 1.17 | 3.00 |
| 0 | 2 | 0 | 0.00 | 1.55 | 0.00 | 0.00 | 3.10 | 0.00 | 1.55 | 3.10 |
| 0 | 3 | 0 | 0.00 | 1.78 | 0.00 | 0.00 | 3.25 | 0.00 | 1.78 | 3.25 |
| 0 | 4 | 0 | 0.00 | 2.00 | 0.00 | 0.00 | 3.40 | 0.00 | 2.00 | 3.40 |
| 0 | 0 | 1 | 0.00 | 0.00 | 2.29 | 0.00 | 0.00 | 4.50 | 2.29 | 4.50 |
| 0 | 0 | 2 | 0.00 | 0.00 | 2.50 | 0.00 | 0.00 | 5.00 | 2.50 | 5.00 |
| 0 | 0 | 3 | 0.00 | 0.00 | 2.78 | 0.00 | 0.00 | 5.30 | 2.78 | 5.30 |
| 0 | 0 | 4 | 0.00 | 0.00 | 3.00 | 0.00 | 0.00 | 5.40 | 3.00 | 5.40 |
| 1 | 1 | 0 | 1.00 | 1.00 | 0.00 | 2.50 | 3.00 | 0.00 | 2.00 | 5.50 |
| 1 | 2 | 0 | 1.00 | 1.55 | 0.00 | 2.50 | 3.10 | 0.00 | 2.55 | 5.60 |
| 1 | 3 | 0 | 1.00 | 1.78 | 0.00 | 2.50 | 3.25 | 0.00 | 2.78 | 5.75 |
| 1 | 4 | 0 | 1.00 | 2.00 | 0.00 | 2.50 | 3.40 | 0.00 | 3.00 | 5.90 |
| 2 | 1 | 0 | 1.17 | 1.00 | 0.00 | 3.00 | 3.00 | 0.00 | 2.17 | 6.00 |
| 2 | 2 | 0 | 1.17 | 1.55 | 0.00 | 3.00 | 3.10 | 0.00 | 2.72 | 6.10 |
| 2 | 3 | 0 | 1.17 | 1.78 | 0.00 | 3.00 | 3.25 | 0.00 | 2.94 | 6.25 |
| 2 | 4 | 0 | 1.17 | 2.00 | 0.00 | 3.00 | 3.40 | 0.00 | 3.17 | 6.40 |
| 1 | 0 | 1 | 1.00 | 0.00 | 2.29 | 2.50 | 0.00 | 4.50 | 3.29 | 7.00 |
| 3 | 1 | 0 | 1.33 | 1.00 | 0.00 | 4.00 | 3.00 | 0.00 | 2.33 | 7.00 |
| 3 | 2 | 0 | 1.33 | 1.55 | 0.00 | 4.00 | 3.10 | 0.00 | 2.89 | 7.10 |
| 3 | 3 | 0 | 1.33 | 1.78 | 0.00 | 4.00 | 3.25 | 0.00 | 3.11 | 7.25 |
| 3 | 4 | 0 | 1.33 | 2.00 | 0.00 | 4.00 | 3.40 | 0.00 | 3.33 | 7.40 |
| 0 | 1 | 1 | 0.00 | 1.00 | 2.29 | 0.00 | 3.00 | 4.50 | 3.29 | 7.50 |
| 1 | 0 | 2 | 1.00 | 0.00 | 2.50 | 2.50 | 0.00 | 5.00 | 3.50 | 7.50 |
| 2 | 0 | 1 | 1.17 | 0.00 | 2.29 | 3.00 | 0.00 | 4.50 | 3.46 | 7.50 |
| 2 | 0 | 1 | 1.17 | 0.00 | 2.29 | 3.00 | 0.00 | 4.50 | 3.46 | 7.50 |
| 0 | 2 | 1 | 0.00 | 1.55 | 2.29 | 0.00 | 3.10 | 4.50 | 3.85 | 7.60 |
| 0 | 3 | 1 | 0.00 | 1.78 | 2.29 | 0.00 | 3.25 | 4.50 | 4.07 | 7.75 |
| 1 | 0 | 3 | 1.00 | 0.00 | 2.78 | 2.50 | 0.00 | 5.30 | 3.78 | 7.80 |
| 0 | 4 | 1 | 0.00 | 2.00 | 2.29 | 0.00 | 3.40 | 4.50 | 4.29 | 7.90 |
| 1 | 0 | 4 | 1.00 | 0.00 | 3.00 | 2.50 | 0.00 | 5.40 | 4.00 | 7.90 |
| (omitted here) | | | | | | | | | | |
| 3 | 3 | 1 | 1.33 | 1.78 | 2.29 | 4.00 | 3.25 | 4.50 | 5.40 | 11.75 |
| 2 | 4 | 4 | 1.17 | 2.00 | 3.00 | 3.00 | 3.40 | 5.40 | 6.17 | 11.80 |
| 3 | 4 | 1 | 1.33 | 2.00 | 2.29 | 4.00 | 3.40 | 4.50 | 5.63 | 11.90 |
| 3 | 1 | 2 | 1.33 | 1.00 | 2.50 | 4.00 | 3.00 | 5.00 | 4.83 | 12.00 |
| 3 | 2 | 2 | 1.33 | 1.55 | 2.50 | 4.00 | 3.10 | 5.00 | 5.39 | 12.10 |
| 3 | 3 | 2 | 1.33 | 1.78 | 2.50 | 4.00 | 3.25 | 5.00 | 5.61 | 12.25 |
| 3 | 1 | 3 | 1.33 | 1.00 | 2.78 | 4.00 | 3.00 | 5.30 | 5.12 | 12.30 |
| 3 | 1 | 4 | 1.33 | 1.00 | 3.00 | 4.00 | 3.00 | 5.40 | 5.33 | 12.40 |
| 3 | 2 | 3 | 1.33 | 1.55 | 2.78 | 4.00 | 3.10 | 5.30 | 5.67 | 12.40 |
| 3 | 4 | 2 | 1.33 | 2.00 | 2.50 | 4.00 | 3.40 | 5.00 | 5.83 | 12.40 |
| 3 | 2 | 4 | 1.33 | 1.55 | 3.00 | 4.00 | 3.10 | 5.40 | 5.89 | 12.50 |
| 3 | 3 | 3 | 1.33 | 1.78 | 2.78 | 4.00 | 3.25 | 5.30 | 5.89 | 12.55 |
| 3 | 3 | 4 | 1.33 | 1.78 | 3.00 | 4.00 | 3.25 | 5.40 | 6.11 | 12.65 |
| 3 | 4 | 3 | 1.33 | 2.00 | 2.78 | 4.00 | 3.40 | 5.30 | 6.12 | 12.70 |
| 3 | 4 | 4 | 1.33 | 2.00 | 3.00 | 4.00 | 3.40 | 5.40 | 6.33 | 12.80 |

FIG.12

| operating status | | | processing capacity | | | power consumption | | | total processing capacity | total power consumption |
|---|---|---|---|---|---|---|---|---|---|---|
| A | B | C | A | B | C | A | B | C | | |
| 0 | 0 | 0 | 0.00 | 0.00 | 0.00 | 0.00 | 0.00 | 0.00 | 0.00 | 0.00 |
| 1 | 0 | 0 | 1.00 | 0.00 | 0.00 | 2.50 | 0.00 | 0.00 | 1.00 | 2.50 |
| 2 | 0 | 0 | 1.17 | 0.00 | 0.00 | 3.00 | 0.00 | 0.00 | 1.17 | 3.00 |
| 0 | 2 | 0 | 0.00 | 1.55 | 0.00 | 0.00 | 3.10 | 0.00 | 1.55 | 3.10 |
| 0 | 3 | 0 | 0.00 | 1.78 | 0.00 | 0.00 | 3.25 | 0.00 | 1.78 | 3.25 |
| 0 | 4 | 0 | 0.00 | 2.00 | 0.00 | 0.00 | 3.40 | 0.00 | 2.00 | 3.40 |
| 0 | 0 | 1 | 0.00 | 0.00 | 2.29 | 0.00 | 0.00 | 4.50 | 2.29 | 4.50 |
| 0 | 0 | 2 | 0.00 | 0.00 | 2.50 | 0.00 | 0.00 | 5.00 | 2.50 | 5.00 |
| 0 | 0 | 3 | 0.00 | 0.00 | 2.78 | 0.00 | 0.00 | 5.30 | 2.78 | 5.30 |
| 0 | 0 | 4 | 0.00 | 0.00 | 3.00 | 0.00 | 0.00 | 5.40 | 3.00 | 5.40 |
| 2 | 4 | 0 | 1.17 | 2.00 | 0.00 | 3.00 | 3.40 | 0.00 | 3.17 | 6.40 |
| 3 | 4 | 0 | 1.33 | 2.00 | 0.00 | 4.00 | 3.40 | 0.00 | 3.33 | 7.40 |
| 2 | 0 | 1 | 1.17 | 0.00 | 2.29 | 3.00 | 0.00 | 4.50 | 3.46 | 7.50 |
| 1 | 0 | 2 | 1.00 | 0.00 | 2.50 | 2.50 | 0.00 | 5.00 | 3.50 | 7.50 |
| 0 | 2 | 1 | 0.00 | 1.55 | 2.29 | 0.00 | 3.10 | 4.50 | 3.85 | 7.60 |
| 0 | 3 | 1 | 0.00 | 1.78 | 2.29 | 0.00 | 3.25 | 4.50 | 4.07 | 7.75 |
| 0 | 4 | 1 | 0.00 | 2.00 | 2.29 | 0.00 | 3.40 | 4.50 | 4.29 | 7.90 |
| 0 | 2 | 3 | 0.00 | 1.55 | 2.78 | 0.00 | 3.10 | 5.30 | 4.34 | 8.40 |
| 0 | 4 | 2 | 0.00 | 2.00 | 2.50 | 0.00 | 3.40 | 5.00 | 4.50 | 8.40 |
| 0 | 2 | 4 | 0.00 | 1.55 | 3.00 | 0.00 | 3.10 | 5.40 | 4.55 | 8.50 |
| 0 | 3 | 3 | 0.00 | 1.78 | 2.78 | 0.00 | 3.25 | 5.30 | 4.56 | 8.55 |
| 0 | 3 | 4 | 0.00 | 1.78 | 3.00 | 0.00 | 3.25 | 5.40 | 4.78 | 8.65 |
| 0 | 4 | 4 | 0.00 | 2.00 | 3.00 | 0.00 | 3.40 | 5.40 | 5.00 | 8.80 |
| 1 | 3 | 1 | 1.00 | 1.78 | 2.29 | 2.50 | 3.25 | 4.50 | 5.07 | 10.25 |
| 1 | 4 | 1 | 1.00 | 2.00 | 2.29 | 2.50 | 3.40 | 4.50 | 5.29 | 10.40 |
| 1 | 2 | 3 | 1.00 | 1.55 | 2.78 | 2.50 | 3.10 | 5.30 | 5.34 | 10.90 |
| 2 | 4 | 1 | 1.17 | 2.00 | 2.29 | 3.00 | 3.40 | 4.50 | 5.46 | 10.90 |
| 1 | 4 | 2 | 1.00 | 2.00 | 2.50 | 2.50 | 3.40 | 5.00 | 5.50 | 10.90 |
| 1 | 2 | 4 | 1.00 | 1.55 | 3.00 | 2.50 | 3.10 | 5.40 | 5.55 | 11.00 |
| 1 | 3 | 3 | 1.00 | 1.78 | 2.78 | 2.50 | 3.25 | 5.30 | 5.56 | 11.05 |
| 1 | 3 | 4 | 1.00 | 1.78 | 3.00 | 2.50 | 3.25 | 5.40 | 5.78 | 11.15 |
| 1 | 4 | 4 | 1.00 | 2.00 | 3.00 | 2.50 | 3.40 | 5.40 | 6.00 | 11.30 |
| 2 | 4 | 4 | 1.17 | 2.00 | 3.00 | 3.00 | 3.40 | 5.40 | 6.17 | 11.80 |
| 3 | 4 | 4 | 1.33 | 2.00 | 3.00 | 4.00 | 3.40 | 5.40 | 6.33 | 12.80 |
| (omitted here) | | | | | | | | | | |
| 2 | 3 | 4 | 1.17 | 1.78 | 3.00 | 3.00 | 3.25 | 5.40 | 5.94 | 11.65 |
| 2 | 4 | 3 | 1.17 | 2.00 | 2.78 | 3.00 | 3.40 | 5.30 | 5.95 | 11.70 |
| 3 | 3 | 1 | 1.33 | 1.78 | 2.29 | 4.00 | 3.25 | 4.50 | 5.40 | 11.75 |
| 3 | 4 | 1 | 1.33 | 2.00 | 2.29 | 4.00 | 3.40 | 4.50 | 5.63 | 11.90 |
| 3 | 1 | 2 | 1.33 | 1.00 | 2.50 | 4.00 | 3.00 | 5.00 | 4.83 | 12.00 |
| 3 | 2 | 2 | 1.33 | 1.55 | 2.50 | 4.00 | 3.10 | 5.00 | 5.39 | 12.10 |
| 3 | 3 | 2 | 1.33 | 1.78 | 2.50 | 4.00 | 3.25 | 5.00 | 5.61 | 12.25 |
| 3 | 1 | 3 | 1.33 | 1.00 | 2.78 | 4.00 | 3.00 | 5.30 | 5.12 | 12.30 |
| 3 | 1 | 4 | 1.33 | 1.00 | 3.00 | 4.00 | 3.00 | 5.40 | 5.33 | 12.40 |
| 3 | 2 | 3 | 1.33 | 1.55 | 2.78 | 4.00 | 3.10 | 5.30 | 5.67 | 12.40 |
| 3 | 4 | 2 | 1.33 | 2.00 | 2.50 | 4.00 | 3.40 | 5.00 | 5.83 | 12.40 |
| 3 | 2 | 4 | 1.33 | 1.55 | 3.00 | 4.00 | 3.10 | 5.40 | 5.89 | 12.50 |
| 3 | 3 | 3 | 1.33 | 1.78 | 2.78 | 4.00 | 3.25 | 5.30 | 5.89 | 12.55 |
| 3 | 3 | 4 | 1.33 | 1.78 | 3.00 | 4.00 | 3.25 | 5.40 | 6.11 | 12.65 |
| 3 | 4 | 3 | 1.33 | 2.00 | 2.78 | 4.00 | 3.40 | 5.30 | 6.12 | 12.70 |

DATA PROCESSING APPARATUS, IMAGE FORMING APPARATUS, IMAGE FORMING METHOD, AND PRINTING SYSTEM

CROSS-REFERENCE TO RELATED APPLICATION

This application is related to Japanese Patent Application No. 2005-342370 filed on Nov. 28, 2005, whose priorities are claimed under 35 USC §119, the disclosure of which is incorporated by reference in its entirety.

BACKGROUND OF THE INVENTION

1. Field of the Invention

The present invention relates to a data processing apparatus capable of improving processing capacity, or reducing power consumption, of a plurality of data processing apparatuses that are connected to a network. In particular, the present invention further relates to an image forming apparatus, an image forming method, and a printing system that are capable of improving processing capacity, or reducing power consumption, of an entire network to which the plurality of data processing apparatuses are connected.

2. Description of Related Art

In recent years, a great amount of data is being produced at offices, and there has been an increasing demand for high speed processing of such data. Examples of data processing required at offices include: producing image data based on a print request, recognizing characters in character data that has been read by a scanner, enlarging, reducing, and rotating image data, recognizing an image in inputted image data, separating areas in inputted image data, translating from a first language (e.g. Japanese) into a second language (e.g. English), compressing data to be transmitted or stored in a memory, decompressing compressed data, encrypting data to be transmitted, and decoding of encrypted data. Such data processing is typically performed by an apparatus in which data is generated or by an apparatus having data processing capacity, in response to a processing request.

However, in some offices, various apparatuses, such as a personal computer, a MFP (Multi Function Printer), a facsimile machine, and a server are connected to a network, and may be commonly used. In addition, there are cases where it is possible to utilize an apparatus capable of processing data more efficiently. Accordingly, with such a network to which various apparatuses are connected, it is desired to accommodate data processing capacity of apparatuses as system resource, thereby utilizing an apparatus having superior data processing capacity, or an apparatus capable of processing data with more efficient power consumption. The data processing as described above utilizes the data processing capacity of a data processing apparatus other than the data processing apparatus that has generated the data, thereby allowing data processing at a higher speed for a user. Further, processing with low energy may be realized for an entire network. It is particularly desired that an image forming apparatus may be operated with efficient power consumption by accommodating data processing capacity of a printer controller.

There have been known patents addressing to the above requests. For example, Japanese Patent Application Laid-Open No. 2004-46774 discloses a technique in which a server selects, in view of power conservation and processing speed, an image forming apparatus to perform image processing and image formation. Japanese Patent Application Laid-Open No. 2005-85164 is for a multi processor system deciding an optimal operating point in view of both power conservation and processing performance. Specifically, No. 2005-85164 discloses a technique for selecting the optimal operating point that has been previously calculated based on relation between frequencies and operating voltage in accordance with job processing, and having the multi processor system operate at the operating point. Further, Japanese Patent Application Laid-Open No. 2002-169676 discloses a technique in which, based on available memory and data processing capacity of a plurality of client terminals and a plurality of printers that are connected to a network, a server allocates data processing required to process a print request to each client terminal and each printer, thereby performing data processing efficiently.

According to Japanese Patent Application Laid-Open No. 2004-46774, it is possible to perform printing at a maximum speed with minimum power consumption by selectively using an image forming apparatus connected to a network. Further, according to Japanese Patent Application Laid-Open No. 2005-85164, it is possible to select an optimal operating point for a multi processor in view of power consumption and processing capacity, and to operate the multi processor at the operating point. Moreover, according to Japanese Patent Application Laid-Open No. 2002-169676, it is possible to process data within a short period of time, effectively utilizing available capacity of a client terminal or a printer that is connected to a network.

In the mean time, as data processing apparatuses and image forming apparatuses in recent years have increasingly become highly functional and high speed, processors for data processing and peripheral devices that are built into such data processing apparatuses and image forming apparatuses have also become highly functional and high speed, with increased power consumption. In addition, in order to accommodate various users with different needs, the data processing apparatuses and the image forming apparatuses include a variety of models with different specifications and capabilities, such as a low speed model, a high speed model, and a low power consumption model. The present invention intends to have an entire network printing system virtually share and accommodate system resource on a network to which devices with various specifications and capabilities as described above, in particular, calculation capacity and data processing capacity of a printer controller, thereby operating the network as a whole based on efficient correlation between processing capacity and power consumption.

To this end, the present invention improves the data processing capacity or the power consumption efficiency for an entire network, by allocating the calculation capacity and the image processing capacity provided to a processor and a peripheral function unit of the data processing apparatus or the image forming apparatus to a data processing apparatus or an image forming apparatus on the network based on the correlation between the data processing capacity and the power consumption. In other words, the present invention provides a data processing apparatus, an image forming apparatus, an image forming method, and a printing system that improve the data processing capacity or the power consumption efficiency. Further, the present invention provides an apparatus for forming an image using an image forming apparatus that has been specified.

SUMMARY OF THE INVENTION

A data processing apparatus according to the present invention is at least one of a plurality of data processing apparatuses connected to a network, and the at least one data processing apparatus includes: a memory that stores correlation between data processing capacity and power consumption of the plurality of data processing apparatuses; a selecting unit that selects a data processing apparatus with which power consumption required for processing a processing request produced by the at least one data processing apparatus is minimized, the selection being made based on the correlation between the data processing capacity and the power consumption, and the selected data processing apparatus being selected out of the plurality of data processing apparatuses including the at least one data processing apparatus; and a transmission unit that transmits the processing request to the selected data processing apparatus according to the selection.

With the above configuration, the data processing capacity or the power consumption efficiency for an entire network may be improved.

BRIEF DESCRIPTION OF THE DRAWINGS

FIG. 4 illustrates a processing capacity/power consumption table according to the present invention.

FIG. 5 illustrates relation between an amount of requested processing and an operating status of each system according to the present invention.

FIG. 9 is a table of normalization processing capacity and normalization power consumption for each operating status of each printer obtained in Step S5 in the flowchart according to the present invention.

FIG. 10 is a table illustrating combinations evaluated in Step S6 flowchart in the flowchart according to the present invention.

FIG. 11 is a table illustrating results extracted in Step S7 in the flowchart according to the present invention.

FIG. 12 is a processing capacity/power consumption table generated in Step S8 in the flowchart according to the present invention.

DESCRIPTION OF PREFERRED EMBODIMENT

Figure 1:
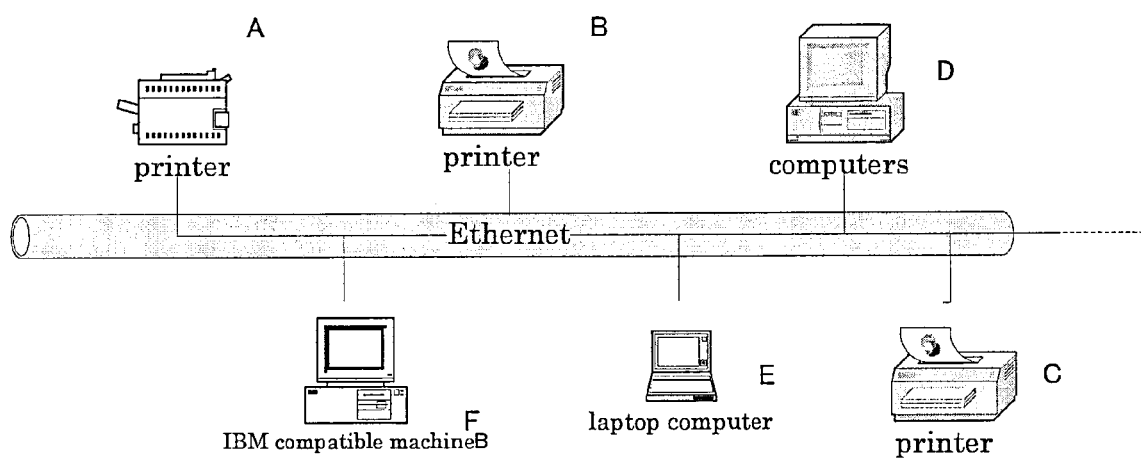
FIG. 1 illustrates a configuration of a network printing system according to the present invention.

A data processing apparatus according to the present invention is at least one of a plurality of data processing apparatuses connected to a network, and the at least one data processing apparatus includes: a memory that stores correlation between data processing capacity and power consumption of the plurality of data processing apparatuses; a selecting unit that selects a data processing apparatus with which power consumption required for processing a processing request produced by the at least one data processing apparatus is minimized, the selection being made based on the correlation between the data processing capacity and the power consumption, and the selected data processing apparatus being selected out of the plurality of data processing apparatuses including the at least one data processing apparatus; and a transmission unit that transmits the processing request to the selected data processing apparatus according to the selection.

On the other hand, the selected data processing apparatus includes: a receiving unit that receives the processing request that has been transmitted from the transmission unit; a data processing unit that processes data of the received processing request; and a transmission unit that transmits the processed data to a data processing apparatus specified by the processing request.

Further, the data processing apparatus to which the transmission unit transmits data is one of the data processing apparatus that has transmitted the processing request, the data processing apparatus that has processed the data of the received processing request, and a different data processing apparatus.

Here, the processing request and the processed data include one of image data produced by converting print data requested to be printed into bitmap data, character data produced by recognizing characters in data that has been read by a scanner, image data produced by enlarging, reducing, and rotating inputted image data, image data produced by recognizing an image in the inputted image data, image data produced by separating areas in the inputted image data, a second language translated from a first language, compressed data produced by compressing data, expanded data produced by expanding the compressed data, encrypted data produced by encrypting the data, and data produced by decoding the encrypted data. Thus, the selection of the data processing apparatus according to a type of the processing may improve processing efficiency of an entire network. In addition, utilizing calculation capacity or the processing capacity of the data processing apparatus or an image forming apparatus may allow processing of a processing request that does not require printing.

Further, the present invention, the data processing apparatus is applied to an image forming apparatus. Therefore, according to the present invention, it is possible to perform image processing processed using a different image forming apparatus, and to output a printout to a given image forming apparatus.

In this case, it is preferable that data requested to be printed by the image forming apparatus is one of PDL (Page Description Language) and GDI (Graphics Device Interface), and the processed image data is bitmap data.

With the present invention, it is preferable that the correlation between the data processing capacity and the power consumption includes data for each operating status of each data processing apparatus. Further, it is preferable that the correlation between the data processing capacity and the power consumption is correlation between processing capacity and power consumption of a printer controller of each image forming apparatus.

Further from a different point of view, the present invention is a data processing method and includes the steps of: obtaining correlation information between data processing capacity and power consumption for each of a plurality of data processing apparatuses connected to a network, when at least one of the data processing apparatuses is turned on; selecting a data processing apparatus with which power consumption required for processing a processing request produced by the at least one data processing apparatus, the selection being made based on the correlation between the data processing capacity and the power consumption, and the selected data processing apparatus being selected out of the plurality of data processing apparatuses including the at least one data processing apparatus; transmitting the processing request to the selected data processing apparatus according to the selection; and receiving processed data that has been processed by the selected data processing apparatus.

Further, the present invention is the data processing method applied to an image forming apparatus. Therefore, according to the present invention, the image processing may be processed using a different image forming apparatus, and print output to a given image forming apparatus.

Further, data processing method of the present invention further includes: sequentially obtaining the correlation information between the data processing capacity and the power consumption for each of the plurality of data processing apparatuses connected to the network; evaluating correlation between the data processing capacity and the power consumption for each of the plurality of data processing apparatuses, for each combination of operating status of each data processing apparatus; generating a table of the correlation between the data processing capacity and the power consumption, by extracting effective combinations in an order of power consumption from the evaluated correlation between the data processing capacity and the power consumption.

Further, the present invention is a medium recorded with a data processing program having a computer execute the steps.

The present invention relates to an data processing apparatus that may be utilized in various types of processing such as producing image data based on a print request, recognizing characters in image data that has been read by a scanner, enlarging, reducing, and rotating image data, recognizing an image in inputted image data, separating areas in inputted image data, translating from a first language (e.g. Japanese) into a second language (e.g. English), compressing data to be transmitted or stored in a memory, expanding compressed data, encrypting data to be transmitted, and decoding encrypted data.

In this embodiment, a case in which image processing is performed utilizing an image forming apparatus, an image forming method, and a printing the system is described. However, the present invention may also be applied to the various types of the data processing as described above.

According to the image forming apparatus of the present invention, when any one of image forming apparatuses that are connected to the network produces a print request, an image forming apparatus that would process the print request with minimum power consumption is selected among the image forming apparatuses that are connected to the network including the image forming apparatus that has produced the print request. The image forming apparatus that has produced the print request, then, transmits the print request to the selected image forming apparatus. Furthermore, a transfer target for the image data is specified. With this configuration, it is possible to achieve optimal processing capacity for an entire network, to process data with optimal power efficiency. Further, it is possible to output a printout through the specified image forming apparatus.

Hereinafter, an embodiment of the present invention is described referring to the drawings. FIG. 1 shows a network printing system, which is provided with three printers including: a small-sized and power-saving specialized printer A, a medium-sized and medium-speed MFP (multi function printer) B, and a large-sized and high-speed MFP (multi function printer) C. In addition, the network printing system is provided with three client terminals including: a high-speed and high-capacity desktop computer D, a small-sized lightweight portable laptop computer E, and an IBM compatible machine F. These printers and terminals are connected to the Ethernet and are capable of communicating each other. Although not shown in FIG. 1, a server may be connected to the network for backup or management of data stored in the client terminals and printers. In this case, the server may allocate a processing request.

Here, the above devices are illustrated for an exemplary purpose, and other devices other than shown here may be connected, more than one of the same type of device many be connected, or any of the devices illustrated here may be omitted. Further, the network may be a wired network, a wire-less network, a local network, or the like.

Figure 2:
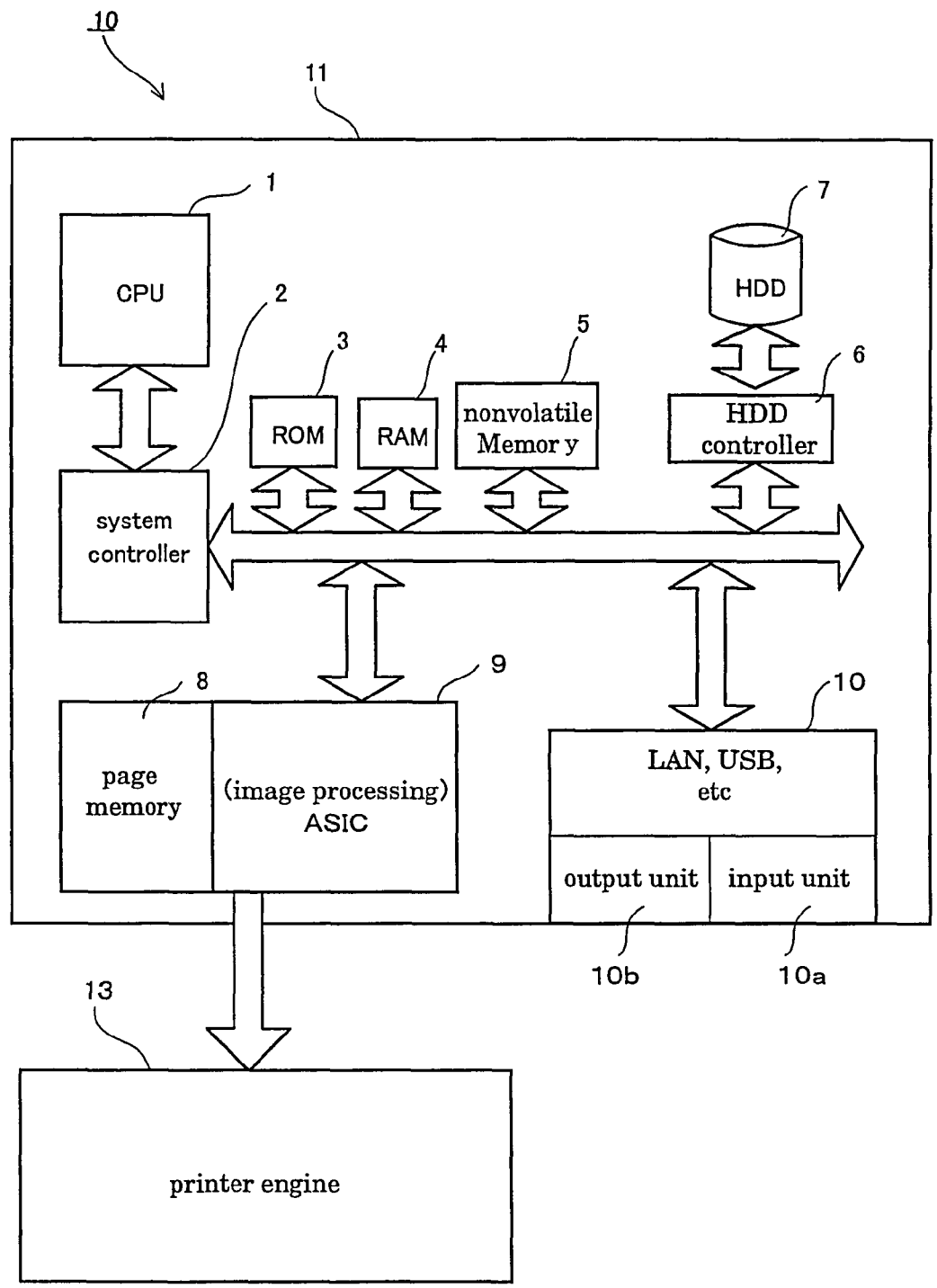
FIG. 2 is a block diagram showing a hardware configuration of a printer according to the present invention according to the present invention.
Figure 3:
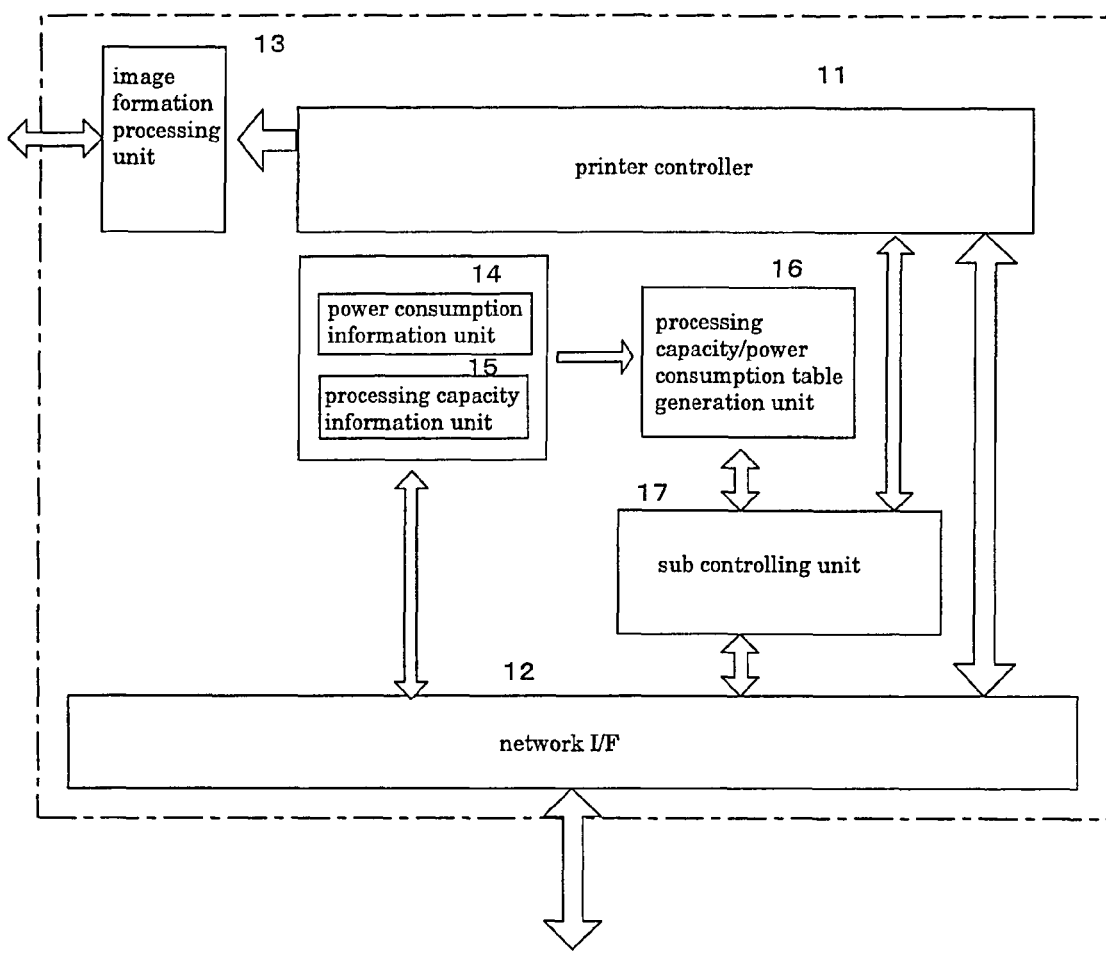
FIG. 3 is a block diagram showing a functional configuration of a printer according to the present invention.

FIGS. 2 and 3 show, for example, a hardware configuration of the printer B. The printers A and C, and the computers D, E, and F are also provided with the same components as the printer B.

The MFP shown in FIG. 2 includes a CPU 1, a system controller 2, and a system bus connected to the system controller 2. The CPU 1 has a data processing function for controlling operation of the MFP and processing a received print request. Connected to the system bus are a ROM 3, a RAM 4, a nonvolatile memory 5, a HDD 7 connected via a HDD controller 6, an image processing unit (ASIC) 9 having a page memory 8, and a data input/output unit 10 including an input unit 10a and an output unit 10b that are constituted by such as LAN or USB. Image data processed by the image processing unit 9 is outputted to a printer engine 13 and processed for printing.

The input unit 10a is an interface for receiving the image data read from a scanner (not shown) provided to this MFP. The input unit 10a is also an interface for receiving printing data transmitted from the printer A or C or the client terminal D, E, or F via the network, or processed image data processed by the printer A or C or the client terminal D, E, or F. Otherwise, the input unit 10a is also an interface for receiving print data transferred from the server. Furthermore, the input unit 10a is an interface for receiving data or an instruction inputted through a touch panel, a keyboard, or a mouse. Moreover, the output unit 10b is an interface for outputting the print data or the image data to the printer A or C or the client terminal D, E, or F, as well as an interface for transmitting the print data or the image data to the server or an external storage device.

The ROM 3 or the HDD 7 stores a program for controlling an operation of the printer as well as a program according to the present invention.

FIG. 3 shows a functional block diagram when the hardware configuration in FIG. 2 performs image processing. A print controller 11 in FIG. 3 corresponds to the HDD 7, the page memory 8, and the image processing unit (ASIC) 9 in the hardware configuration of FIG. 2. The print controller 11 interprets a page description language (PDL) or GDI transmitted to the MFP from the network via a network I/F 12, and generates data with which an image may be formed. Specifically, the print controller 11 converts the PDL or a GDI into bitmap data. An image formation processing unit 13 corresponds to the printer engine 13 in FIG. 2, and processes printing of the bitmap data produced by the print controller 11. A power consumption information unit 14 is a memory that stores power consumption information for each operating status of each printer connected to the network. A processing capacity information unit 15 is a memory that stores processing capacity information for each operating status of each printer connected to the network. A processing capacity/power consumption table generating unit 16, which generates a table indicating correlation between the processing capacity and the power consumption, generates and stores a processing capacity/power consumption table, according to which a printer and an operating status corresponding to an amount of the processing request is selected, based on information obtained from the power consumption information unit 14 and the processing capacity information unit 15. The processing capacity/power consumption table will be described later with reference to FIG. 4. A sub controlling unit 17 is a controlling unit that accompanies the printer controller 11, and controls the generation of the table by the processing capacity/power consumption table generating unit 16, the transfer of a received job, and other processing.

While all of the printers and the computers may be configured to have the configuration shown in FIGS. 2 and 3, it is also possible that a single printer or some of the printers connected to the network is/are configured to have this configuration, and that the printer(s) with this configuration may select a printer to process the print request according to the processing capacity/power consumption table. Further, the server may be configured to have the configuration of FIGS. 2 and 3.

The data processing performed by the printer is the processing of converting print data received from a printer or a client terminal into image data. Types of the print data include the PDL and the GDI. In a case using the GDI format, it is not necessary to generate image data because the data transmitted is image data. The processing the printer is to perform here is relatively easy processing of outputting the image data to an image output unit after such processing as dithering or error diffusion processing for adjusting the halftone to the tone reproducible by the printer engine, correcting the tone to tone characteristics of the printer engine, converting RGB signals into CMYK signals and color matching when color printing. In a case using the PDL, the transmitted data describes character, figures, positions and an overlaying manner of pictures, a manner of filling of a figure, and font types of the characters. Accordingly, it becomes necessary to interpret the descriptions and draws an image to form image data, in addition to the processing as in the case of the GDI.

Further, instead of generating the bitmap image data directly from the PDL, the printer may first interpret the PDL into a printer-specific intermediate language that enables high-speed drawing to store the intermediate language in a page buffer or a band buffer of the RAM, and generate the image data from the intermediate language at a stage when transmitting the data to the printer engine. In a case using the intermediate PDL, the client terminal transmits the intermediate language data in accordance with characteristics and processing methods of the printer, and consequently, there remains only very little image processing that is still required.

In the case in which a printer or a client terminal produces the print request, a data format includes information such as a name of the printer or the client terminal, a type of the data, print data, types of processing to be performed to the image data, a number of pages, a size of paper, a required processing level, and a printout target. The above data is all required, but a part of the data may be omitted in some cases. For example, the required processing level above may be calculated based on the type of the data, the types of processing to be performed to the image data, and the size of paper of the data transmitted from the client terminal.

While the configuration of the printer is described as above, the client terminal also has functions of producing print data and outputting a print request to the printer. These functions are well-known, and not described here. Further, the client terminal may also have the functions of producing intermediate PDL based on a print request, recognizing characters in image data that has been read by a scanner, enlarging, reducing, and rotating image data, recognizing an image in inputted image data, separating areas in inputted image data, translating from a first language (e.g. Japanese) into a second language (e.g. English), compressing data to be transmitted or stored in a memory, expanding compressed data, encrypting data to be transmitted, and decoding encrypted data. A single client terminal may not necessarily be provided with all of these functions, and the data processing apparatuses and the image forming apparatuses connected to the network may be provided with these functions as a whole.

Next, the processing capacity and the power consumption of each printer in the network printing system of the present invention are described. While printers having the same specification and capability can be connected to the network printing system, printers with various different specifications and functions are generally connected to the network printing system. Accordingly, it is often the case that the respective printers have different processing capacity and different power consumption. Likewise, the respective client terminals have different data processing capacity and different power consumption ratios.

Here, in order to facilitate the comparison of the data processing capacity and the power consumption between the respective printers, the data processing capacity and the power consumption are normalized based on a specific standard. As the standard, for example, a processing speed of converting to image data from PDL data for a single page in A4 size is taken as the data processing capacity, and the power consumption at this time is taken as the standard. Then, based on the above standard, data processing capacity and power consumption for each operating status of each PDL are obtained. A data processing capacity/power consumption table generated by the normalization as described above is shown in FIG. 4 as Table 1. Recent printers, especially MFPs, are configured to have several operating statuses with different power consumptions and capacities according to the respective operating statuses in order to reduce the power consumption. Therefore, the printer may have extra data processing capacity in one operating status, in which the printer moves to a state of low power consumption, in order to reduce the power consumption.

In the data processing capacity/power consumption table shown in FIG. 4, an operating status 1 of a system A is taken as a normalization standard, and numbers are expressed with setting normalization processing capacity at this time 1.00 and normalization power consumption 2.50. More specifically, in the data processing capacity/power consumption table, operation frequencies of a processor are shown based on an amount of work during a single cycle. Other possible standards for the normalization include a time period or power consumption required for processing image data to be a standard, or a measurement result by a program for measuring performance or the power consumption. Further, the system A have an operating status 2 and an operating status 3, and their respective normalization processing capacity and normalization power consumption are shown. A system B and a system C have the operating status 1 to an operating status 4, and their respective normalization processing capacity and normalization power consumption are shown. Corresponding to the system A shown in FIG. 4 is the printer A shown in FIG. 1, and corresponding to the system B is the printer B, and to the system C is the printer C.

Although the amount of processing here is expressed by the operating statuses 1 to 4, a definition of the amount of processing may be any manner, provided that the processing capacity and the power consumption vary. Further, although not shown in Table 1 in FIG. 4, it is possible to lower the power consumption to almost zero by cutting off a main power when the processing capacity is not necessary at all, such as in a power-saving mode and a stand-by mode.

As apparent from Table 1 shown in FIG. 4, it is most advantageous in this example to operate the system A at the operating status 2 if an amount of the processing request is in a range of the normalization processing capacity 1.00 to 1.17 when all the printers in the system are powered off. Specifically, it is not possible to process the amount of a processing request sufficiently when operating the system A at the operating status 1, and it becomes a waste of power when operating the system A at the operating status 3 or operating the system B at the operating status 2 or more. Moreover, when the amount of a processing request is more than the normalization processing capacity 1.17 but not more than 2.0, it is more advantageous to turn off the system A and to operate the system B at the operating status 4 in view of the processing capacity and the power consumption.

Hereinafter in the same manner, a table showing which printer should be operated at which operating status for the amount of a processing request required for the system is Table 2 in FIG. 5. The normalization processing capacity in Table 1 and an amount of requested work in Table 2 both mean the same thing, and the amount of requested work in Table 2 is obtained by adding one to three of the normalization processing capacities in Table 1 for the systems A, B, and C and sorted in a descending order of the amount of requested processing. Accordingly, Table 2 indicates which operation status among the systems A, B, and C should be turned on for the amount of requested processing. For example, when the amount of requested processing is 1.17, the operation should be at the operating status 2 of the system A. Further, when the amount of requested processing is 5.17, the operation should be at the operating status 1 of the system A and the operating status 4 of the systems B and C. As it turned out from Table 2, it is possible to select an operating point with high data processing capacity or low power consumption, and it is possible to enjoy both merits of low power consumption and high processing speed as an entire network.

Figure 6:
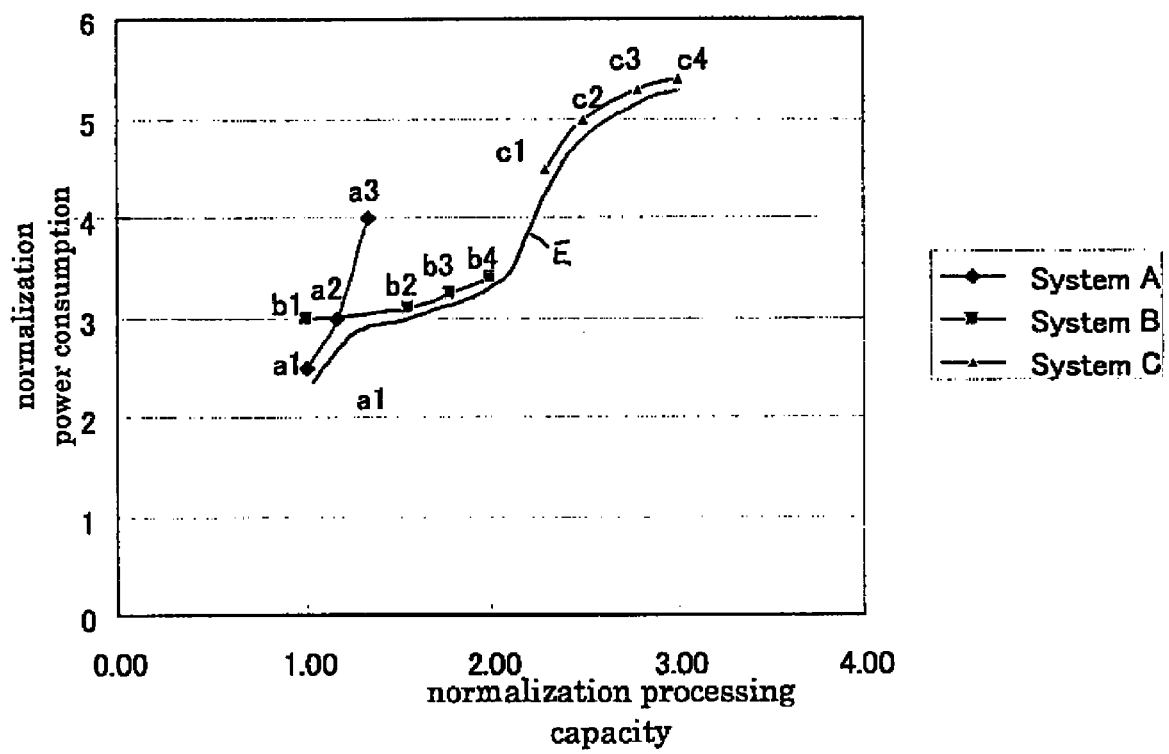
FIG. 6 is a graph showing relation between normalization processing capacity and normalization power consumption according to the present invention.

FIG. 6 is a graph showing a combination of FIGS. 4 and 5, and a curve a represents relation between the normalization processing capacity and the normalization power consumption of the system A. Points a1 to a3 on the curve a correspond to the respective operating statuses in FIG. 4. Likewise, a curve b and a curve c represent the relations between the normalization processing capacity and the normalization power consumption of the system B and the system C, respectively. Points b1 to b4 and points c1 to c4 correspond to the respective operating statuses in FIG. 4.

It can be seen from FIG. 6 that the system B is more advantageous than the system A in some points in view of the processing capacity and the power consumption, and at the same time the system A is more advantageous than the system B in other points. For example, while the processing capacity at the point a1 is the same as that at the point b1, the power consumption at the point a1 is smaller than that at the point b1. In contrast, the processing capacity at the point b2 is larger than that at the point a3, but the power consumption at the point b2 is smaller than that at the point a3.

As described above, depending on the amount of requested processing, it can be seen that appropriately selecting the system A, B, or C may reduce the power consumption to the processing capacity. In other words, a curve connecting points in the curve a, b, and c that indicate low processing capacity represents a curve E whose correlation between the processing capacity and the power consumption is the most advantageous in this system. As described above, combinations of the system A, B, and C in which the power consumption is advantageous according to the amount of requested processing are previously generated and stored in the processing capacity/power consumption table.

This Table 2 is generated, assuming that the systems A, B, and C all have the same image processing functions, by adding the normalization processing capacity in Table 1. However, as in a case of processing supporting color printing and monochrome printing, when another processing may not be executed using the processing capacity/power consumption table, a different curve based on another processing capacity/power consumption table may be prepared for the unexecutable processing, and either of the processing capacity/power consumption tables that is appropriate for the processing content may be used.

As described above, each printer disclosing the processing capacity and the power consumption and a current operation status based on the processing capacity/power consumption table, the printer that has received the print request may direct to the printer with which the print request that has been requested according to a certain algorithm is processed with the lowest power consumption among the printers on a predetermined network.

Figure 7:
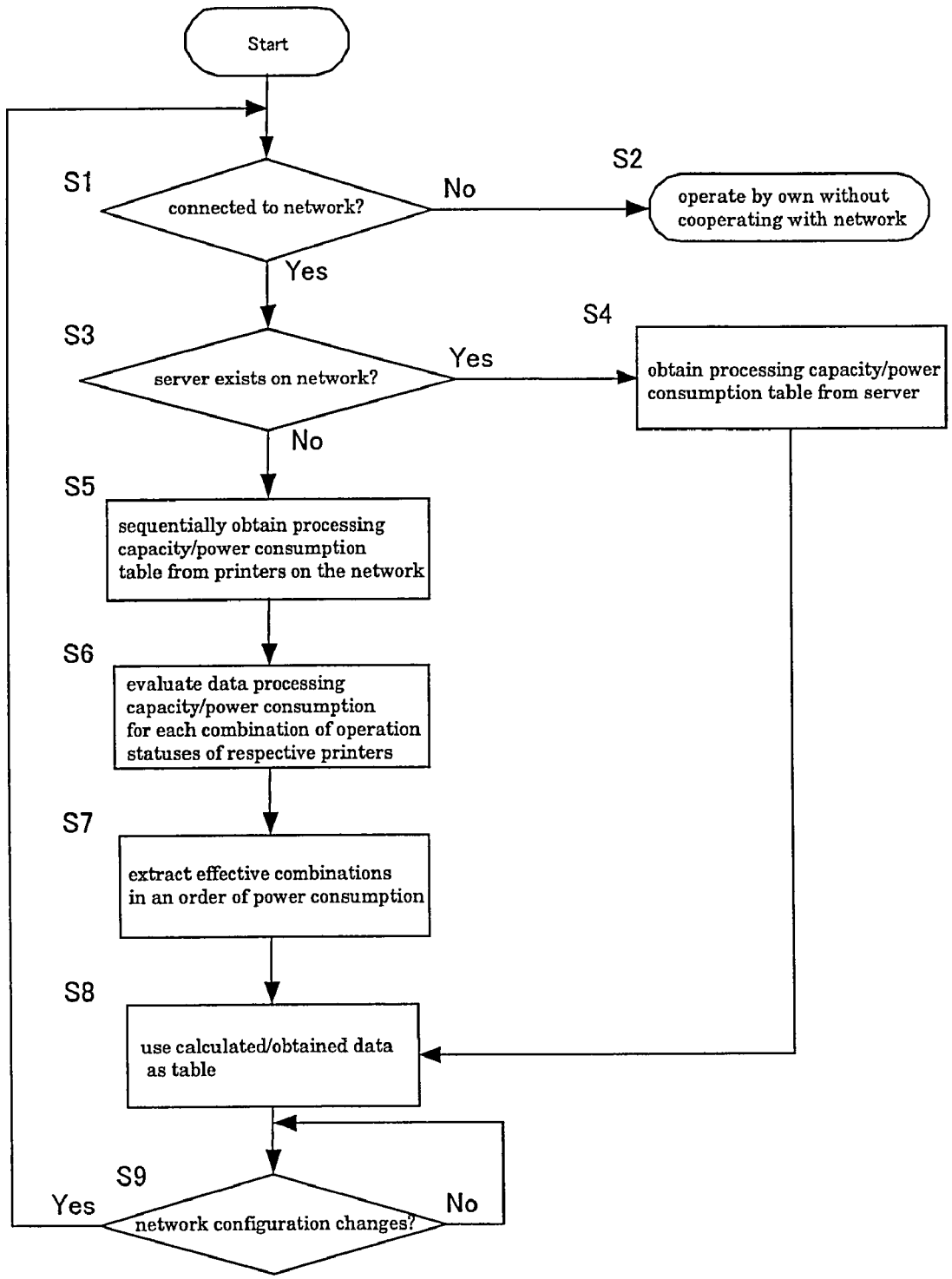
FIG. 7 is a flowchart for generating the processing capacity/power consumption table according to the present invention.
Figure 8:
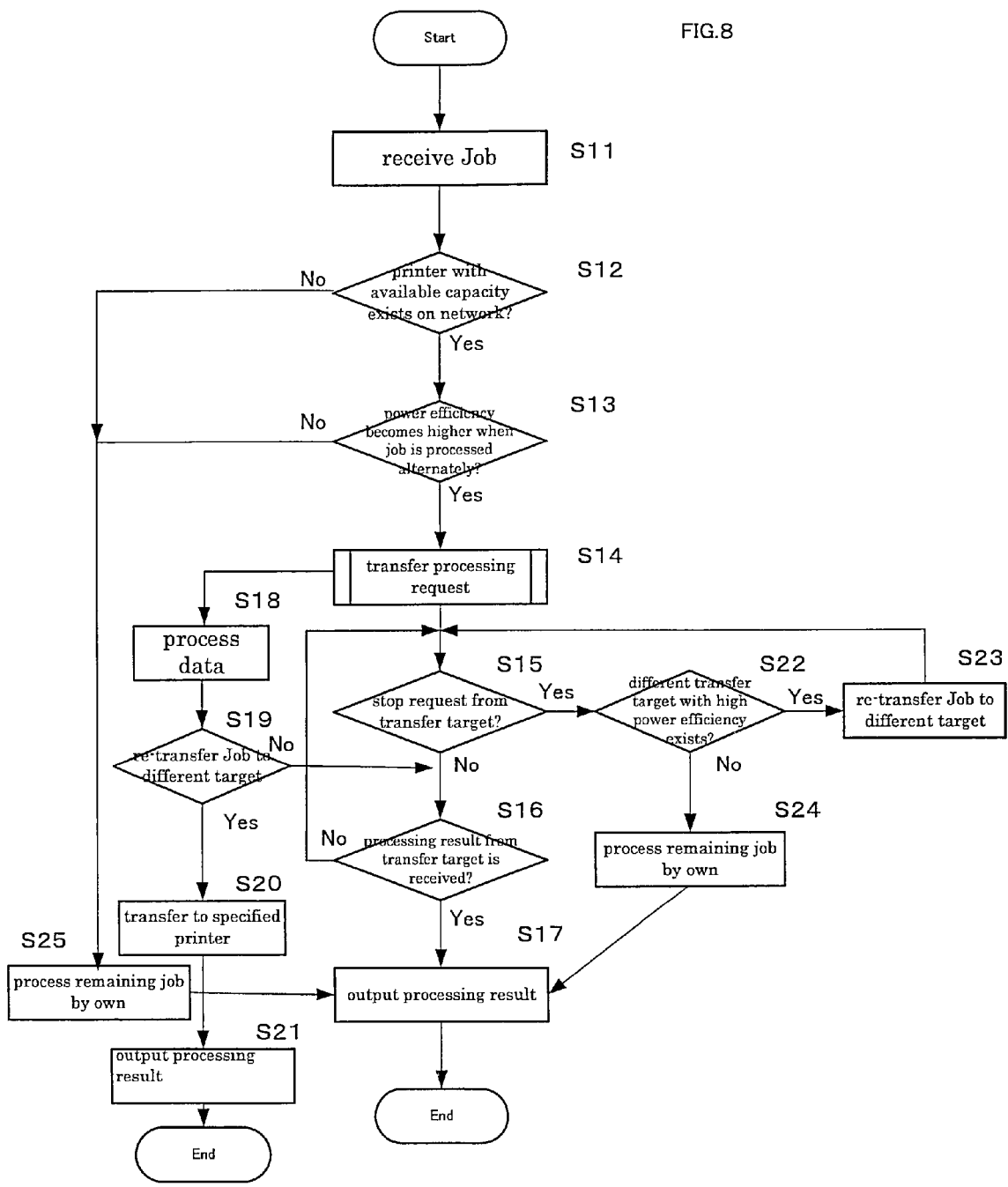
FIG. 8 is a flowchart for selecting an optimal printer and an optimal operating mode according to the present invention.

Next, an operational flow of the present system is described with reference to FIGS. 7 and 8. This flow is realized, for example, by reading a program according to the present invention stored in the ROM 3, and by sequentially executing steps. FIG. 7 shows a flowchart of an operation from one or all of the three printers shown in FIG. 1 are turned on, till the data processing capacity/power consumption table is generated. FIG. 8 shows a flowchart of an operation in which one printer selects an optimal printer and an optimal operating status using the data processing capacity/power consumption table, and processes the data using the selected printer and the operating status.

When turning on at least one of the printers in the network printing system shown in FIG. 1, the printer confirms if the printer itself is connected is to the network (S1). If the printer is not connected to the network (S1: NO), the operation proceeds to Step S2, and the printer processes the print operation by its own without cooperating with the network. When the printer is connected to the network (S1: Yes), the operation proceeds to Step S3, and the printer confirms whether or not the network includes a server that stores the processing capacity/power consumption table of each printer connected to this network. If such a server exists, the operation proceeds to Step S4, and the printer obtains a data processing capacity/power consumption ratio table from the server.

If such a server does not exist on the network, the printer sequentially obtains, from each printer on the network, information on the data processing capacity/power consumption ratio of the each printer (S5). The information on the data processing capacity/power consumption ratio obtained from each printer in Step S5 is shown in FIG. 9. Table 3 shown in FIG. 9 is the same as Table 1 shown in FIG. 4 above, and Table 3 is a table shows normalized data processing capacity and normalized power consumption for each operating status of each system. Next, the data processing capacity/power consumption ratio is evaluated for each of the obtained combinations of the operation statuses of the respective printers (S6). FIG. 10 shows Table 4 in which all of the combinations including power off from Table 3 are shown, and "operating status" in a left column indicates all of the combinations of the operating statuses 1 to 4 of the systems A, B, and C. "Processing capacity" and "power consumption" in middle columns indicate the normalization processing capacity and the normalization power consumption of the systems A, B, and C. "Total processing capacity" in a right column indicates total processing capacity for each row of the systems A, B, and C, and "total power consumption" indicates total processing capacity for each row of the systems A, B, and C.

Next, effective combinations are extracted in an order of the power consumption, and sorted according to the power consumption, thereby generating the data processing capacity/power consumption ratio table (Table 5) (S7). FIG. 11 shows Table 5 sorted by the order of the power consumption of data extracted in an order from lower data processing capacity. In Table 5, blocks shown by bold lines are effective, and the combinations in which the data processing capacity is not improved in comparison with the power consumption are shown in small characters, indicating that these should be excluded from the combinations of the data processing capacity/power consumption ratio. FIG. 12 shows Table 6 which is organized by excluding the combinations to be excluded in FIG. 11. Numbers shown in blocks with bold lines in Table 6 in FIG. 12 are used in a data processing capacity/power consumption ratio table according to the present invention, and the part shown below "omitted here" is the part excluded from the combinations shown in Table 5 in FIG. 11. Next, the data processing capacity/power consumption ratio table generated in Step S7 or the data processing capacity/power consumption ratio table obtained in Step S4 is used (S8). A flow for data processing at an optimal operation mode with an optimal printer using the data processing capacity/power consumption ratio table is described according to FIG. 8.

When a different printer is connected to or disconnected from the network, the operation proceeds to Yes in Step S9, and returns to Step S1. Here, the cases in which a different printer is connected or disconnected include a case in which a printer is newly connected to or disconnected from the network, and a case in which a printer is turned on or off.

Next, a flow for selecting an optimal printer and an operating status using the data processing capacity/power consumption table is described according to FIG. 8.

Suppose one printer receives a processing request (print job) (S11). Here, the processing request may be received from the client PC connected to the network, or may be image data read with the scanner provided to the own printer. Upon reception of the processing request, the printer searches in the network for a printer with available capacity, namely, a printer that reduces the power consumption by reducing the data processing capacity than that in a normal operation (S12). If there is no printer with available capacity on the network, the operation proceeds to Step S25, and the printer processes the print request by its own. If there is a printer that reduces the power consumption than that in the normal operation (S12: Yes), the printer judges in Step S13, using the data processing capacity/power consumption ratio table, whether or not there is a printer with which data processing efficiency becomes highest or a printer with which the power consumption becomes lowest (S13). In other words, using the data processing capacity/power consumption ratio table, the printer selects an optimal printer and an operating mode with which power consumption may be reduced when the above processing request is transferred to the selected printer. Next, the processing request is transferred to the selected printer (S14). Upon the transfer, data such as a name of the printer that has produced the processing request, a type of the data, types of processing to be performed to the image data, a number of pages, a size of paper, a required processing level, and a printout target of a printout may also be included. Although not all of the above data is required, it is necessary to include the name of the printer, the type of the data, and the output target are necessary. In a case in which the processing efficiency or the power efficiency may not be increased even if the processing request is alternately processed by a different printer using the data processing capacity/power consumption ratio table at Step S13 (S13: No), the operation proceeds to Step S25, and the printer processes the print request by its own. In this case, the transfer processing such as data transmission or reception is not necessary. In addition, the data transmission including the name of the printer, the type of the data, and the output target is not necessary as well.

The printer to which the processing request has been transferred at Step S14 determines the operating status according to a content of the processing request and performs the data processing (S18). Following the data processing, the printer confirms whether or not an output target of the data output has been specified (S19). If specified, the printer transfers the data to the specified output target (S20). A printer that receives the transferred data outputs the data (S21), and the operation of this flow ends. If the output target has not been specified at Step S19, the data is returned to the printer that has received the transferred data at Step S14.

After transferring the processing request at Step S14, it is determined whether or not the stop request of the data processing is transmitted from the transfer target at Step S15. Specifically, the printer stands by until the data that has been processed is received from the printer as the transfer target. Once the printer receives all of the data that has been processed from the transfer target (S16), the printer forms and outputs an image (S17). If, there is a transfer stop request from the transfer target printer at Step S15 (S15: Yes), the printer confirms again whether or not there is a printer with next higher processing efficiency or power efficiency to the printer selected at Step S13, using the data processing capacity/power consumption ratio table (S22). If there is a printer with high processing efficiency or power efficiency, the printer again performs the transfer to this printer (S23). If there is no printer with next higher processing efficiency or power efficiency to the printer selected at Step S13, and there is no printer that has higher processing efficiency or power efficiency than the own printer, the operation proceeds to Step S24, and the printer processes the print request by its own.

As described above, with the present invention, it is possible to select an optimal printer and an optimal operating status using the data processing capacity/power consumption ratio table. As a result, in the case in which a network printing system is formed, an optimal printer and an optimal operating status may be selected from printers that constitute the network printing system, and thus it is possible to realize data processing with maximum processing capacity or minimum power consumption. With this configuration, the printer of the present invention may minimize the power consumption of the system for the required processing and may keep the printer always operating at high efficiency, by sharing and accommodating the printer controller that is built into the printer through the network.

Further, while a printer is mainly selected as a transfer target when the processing request is for printing, a client terminal (computer) or a server on the network may also serve as the transfer output as long as the same type of processing as requested may be performed.

The above embodiment described the case of converting a print request into image data. However, the present invention may also be applied to the processing such as recognizing characters in image data that has been read by a scanner, enlarging, reducing, and rotating image data, recognizing an image in inputted image data, separating areas in inputted image data, translating from a first language (e.g. Japanese) into a second language (e.g. English), compressing data to be transmitted or stored in a memory, expanding compressed data, encrypting data to be transmitted, and decoding of encrypted data. In this case, a data processing capacity/power consumption table may be generated for each processing, and an optimal processing apparatus and an optimal operating status may be selected according to an amount of requested processing. Further, in this case, a step of confirming a type of processing and a step of selecting a data processing apparatus capable of performing the processing corresponding to the type of the processing may be provided before selecting the optimal processing apparatus and the optimal operating status.

It should be apparent to those skilled in the art that the present invention may be embodied in many other specific forms without departing from the spirit or scope of the invention. Therefore, the present invention is not to be limited to the details given herein, but may be modified within the scope and equivalence of the appended claims.

What is claimed is:

1. A data processing apparatus that is at least one of a plurality of data processing apparatuses connected to a network, the at least one data processing apparatus having a plurality of operating statuses for converting input data to processed data and comprising:

a memory that stores data representing a relation between data processing capacity and power consumption for each operating status of the plurality of data processing apparatuses, wherein the relation comprises the data processing capacity represented as a normalized standard of a processing speed for processing a specified amount of input data, and the power consumption is the power consumption corresponding to the normalized data processing capacity;

a selecting unit that selects a data processing apparatus having an operating status with which power consumption required for processing a processing request produced by the at least one data processing apparatus is minimized, according to an amount of the processing request, the selection being made based on the relation between the data processing capacity and the power consumption for each operating status, and the selected data processing apparatus being selected out of the plurality of data processing apparatuses including the at least one data processing apparatus; and a transmission unit that transmits the processing request to the selected data processing apparatus according to the selection.

2. The data processing apparatus according to claim 1, wherein
   the selected data processing apparatus includes:
   a receiving unit that receives the processing request that has been transmitted from the transmission unit;
   a data processing unit that processes data of the received processing request; and
   a transmission unit that transmits the processed data to a data processing apparatus specified by the processing request.

3. The data processing apparatus according to claim 2, wherein
   the data processing apparatus to which the transmission unit transmits data is one of the data processing apparatus that has transmitted the processing request, the data processing apparatus that has processed the data of the received processing request, and a different data processing apparatus.

4. The data processing apparatus according to claim 2, wherein
   the processing request and the processed data include one of image data produced by converting print data requested to be printed into bitmap data, character data produced by recognizing characters in data that has been read by a scanner, image data produced by enlarging, reducing, and rotating inputted image data, image data produced by recognizing an image in the inputted image data, image data produced by separating areas in the inputted image data, a second language translated from a first language, compressed data produced by compressing data, expanded data produced by expanding the compressed data, encrypted data produced by encrypting the data, and data produced by decoding the encrypted data.

5. The data processing apparatus according to claim 1, wherein
   the data processing apparatus is applied to an image forming apparatus.

6. The data processing apparatus according to claim 5, wherein
   data requested to be printed by the image forming apparatus is one of PDL and GDI, and the image forming apparatus converts the data requested to be printed into bitmap image data for printing.

7. The data processing apparatus according to claim 5, wherein
   the correlation between the data processing capacity and the power consumption is correlation between processing capacity and power consumption of a printer controller of each image forming apparatus.

8. A data processing method, comprising the steps of:
   obtaining data representing a relation between data processing capacity and power consumption for each of a plurality of operating statuses for each of a plurality of data processing apparatuses connected to a network, when at least one of the data processing apparatuses is turned on, wherein the relation comprises the data processing capacity represented as a normalized standard of a processing speed for processing a specified amount of input data, and the power consumption is the power consumption corresponding to the normalized data processing capacity;
   selecting a data processing apparatus having an operating status for converting input data to processed data with which power consumption required for processing a processing request produced by the at least one data processing apparatus is minimized, according to an amount of the processing request, the selection being made based on the relation between the data processing capacity and the power consumption for each operating status, and the selected data processing apparatus being selected out of the plurality of data processing apparatuses including the at least one data processing apparatus;
   transmitting the processing request to the selected data processing apparatus according to the selection; and
   receiving processed data that has been processed by the selected data processing apparatus.

9. The data processing method according to claim 8, wherein
   the data processing method is applied to an image forming apparatus.

10. The data processing method according to claim 8, further comprising:
    sequentially obtaining the correlation information between the data processing capacity and the power consumption for each of the plurality of data processing apparatuses connected to the network;

evaluating correlation between the data processing capacity and the power consumption for each of the plurality of data processing apparatuses, for each combination of operating status of each data processing apparatus;

generating a table of the correlation between the data processing capacity and the power consumption, by extracting effective combinations in an order of power consumption from the evaluated correlation between the data processing capacity and the power consumption.

11. A non-transitory computer readable medium recorded with a data processing program having a computer execute the steps according to claim 8.

12. A non-transitory computer readable medium recorded with a data processing program having a computer execute the steps according to claim 9.

13. A non-transitory computer readable medium recorded with a data processing program having a computer execute the steps according to claim 10.

* * * * *